US008142941B2

(12) United States Patent
Bitoh

(10) Patent No.: US 8,142,941 B2
(45) Date of Patent: Mar. 27, 2012

(54) POWER SUPPLY SYSTEM AND CONTROL METHOD THEREOF

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1100 days.

(21) Appl. No.: 11/639,737

(22) Filed: Dec. 15, 2006

(65) Prior Publication Data

US 2007/0141417 A1     Jun. 21, 2007

(30) Foreign Application Priority Data

Dec. 19, 2005   (JP) ................................ 2005-364490

(51) Int. Cl.
*H01M 8/06* (2006.01)
(52) U.S. Cl. ......... 429/423; 429/430; 429/431; 429/441
(58) Field of Classification Search .................... 429/23, 429/423
See application file for complete search history.

(56) References Cited

U.S. PATENT DOCUMENTS

| 6,436,561 | B1 * | 8/2002 | Hart-Predmore et al. ..... 429/425 |
| 6,555,989 | B1 * | 4/2003 | Pearson ......................... 320/101 |
| 2001/0014414 | A1 * | 8/2001 | Okamoto et al. ............... 429/20 |
| 2003/0224230 | A1 | 12/2003 | Stocker |
| 2004/0028968 | A1 * | 2/2004 | Okamoto ........................... 429/23 |
| 2004/0217652 | A1 * | 11/2004 | Bitoh ............................... 307/43 |
| 2005/0153182 | A1 | 7/2005 | Ozeki et al. |
| 2005/0255353 | A1 | 11/2005 | Komachiya et al. |

FOREIGN PATENT DOCUMENTS

| CN | 1602561 A | 3/2005 |
| EP | 1 505 677 A1 | 2/2005 |
| JP | 2001-231176 A | 8/2001 |
| KR | 2004-105697 A | 12/2004 |
| TW | 558852 B | 10/2003 |
| TW | 200410441 A | 6/2004 |
| TW | 224884 B | 12/2004 |
| WO | WO 03/034527 A2 | 4/2003 |

OTHER PUBLICATIONS

Chinese Office Action dated Jul. 24, 2009 (6 pages), and English translation thereof (7 pages), issued in counterpart Chinese Application Serial No. 2006800479698.

(Continued)

*Primary Examiner* — Ula C Ruddock
*Assistant Examiner* — Patricia Davis
(74) *Attorney, Agent, or Firm* — Holtz, Holtz, Goodman & Chick, PC

(57) ABSTRACT

There is provided a power generation system. A chemical reacting section receives a power generation fuel and reforms the power generation fuel to generate a power generation gas containing hydrogen. A power generating section receives the power generation gas, reacts a part of the power generation gas to generate electrical energy, supplies the electrical energy to a load, and discharges an unreacted component in the power generation gas as an off-gas. A heating section receives the off-gas and generates a thermal energy by using the off-gas to heat the chemical reacting section. An output control section controls the amount of electrical energy output from the power generating section. A control section controls the amount of electrical energy output from the power generating section to change a temperature of the chemical reacting section set based on the thermal energy to a predetermined temperature.

16 Claims, 7 Drawing Sheets

OTHER PUBLICATIONS

International Search Report and Written Opinion of the International Searching Authority, dated Apr. 26, 2007, for PCT/JP2006/325673, 11 sheets.

Taiwanese Office Action dated May 3, 2010 and English translation thereof issued in counterpart Taiwanese Application No. 095147433.
Korean Office Action dated Jul. 27, 2010 (and English translation thereof) in counterpart Korean Application No. 10-2008-7014710.

* cited by examiner

POWER SUPPLY SYSTEM AND CONTROL METHOD THEREOF

CROSS-REFERENCE TO RELATED APPLICATIONS

This application is based upon and claims the benefit of priority from prior Japanese Patent Application No. 2005-364490, filed Dec. 29, 2005, the entire contents of which are incorporated herein by reference.

BACKGROUND OF THE INVENTION

1. Field of the Invention

The present invention relates to a power supply system, and a control apparatus and a control method thereof, and more particularly to a power supply system that receives a power generation fuel to generate a power generation gas containing hydrogen and supplies the generated gas to a power generating unit to perform a power generating operation, and a control apparatus and a control method thereof.

2. Description of the Related Art

In recent years, with an increase in interest in environmental issues or energy problems, a fuel cell (or a power supply system using a fuel cell) has attracted attention as a power supply system (or a power generating system) that forms a next-generation mainstream. As is well known, a power generation theory of a fuel cell has an advantage that greenhouse gases or contaminants are rarely discharged and an influence on an environment (an environmental load) is very small since an electrochemical reaction using hydrogen and oxygen is utilized to output electrical energy. Further, power generation efficiency (an energy conversion efficiency) that is extremely higher than that in a conventional power generating system (e.g., a system that generates electrical energy based on thermal energy or the like obtained by burning, e.g., a fossil fuel) can be realized, and hence studies and developments aiming at full-scale spread in various industrial fields are actively carried out.

Here, although directly supplying hydrogen gas having a high concentration as a power generation fuel applied to a fuel cell is desirable, a system that directly supplies such hydrogen gas to a fuel cell main body is hard to be extensively and rapidly spread because of difficulties in processing in a technical or safety aspect at the time of generation, storage or supply of the hydrogen gas or an economical viewpoint such as provision of a social infrastructure. This system is put to practical use in a relatively large system, e.g., a power generating unit in a specific business establishment or a driving device for some special vehicles.

On the other hand, when a power supply system using a fuel cell is applied to a small portable electronic device (a portable device), e.g., a notebook computer or a mobile phone, it is considered that using a hydrocarbon-based liquid fuel (alcohols), e.g., methanol or ethanol that is readily available and easy to use and has a low manufacturing cost is realistic.

In a power supply system using such a liquid fuel, as a mode of supplying a power generation fuel to a fuel cell, a direct fuel supply mode of directly supplying a corresponding power generation fuel (methanol) to a fuel cell main body and a reformed fuel supply mode of supplying hydrogen gas obtained by reforming a corresponding power generation fuel are known.

In a fuel cell adopting the direct fuel supply mode, since a power generation fuel such as methanol can be directly supplied to a fuel cell main body, a structure of a later-described fuel reformer or the like is not required in a fuel supply path, and this fuel cell (a power supply system) has an advantage that its structure can be simplified. However, the fuel cell adopting this mode generally has a drawback that its power generation efficiency (an energy conversion efficiency) is lower than that of a fuel cell adopting the reformed fuel supply mode.

On the other hand, the fuel cell adopting the reformed fuel supply mode has an advantage that its power generation efficiency (the energy conversion efficiency) is higher than that of the fuel cell adopting the direct fuel supply mode since hydrogen gas having a high purity (a high concentration) generated by reforming a power generation fuel such as methanol can be supplied to a fuel cell main body.

A power supply system to which a fuel cell adopting the reformed fuel supply mode is applied in a conventional technology will now be briefly explained.

FIG. 6 is a schematic block diagram showing a structural example of the power supply system to which the fuel cell adopting the reformed fuel supply mode is applied in the conventional technology.

FIG. 7 is a schematic view showing an example of a chemical reaction in a chemical reacting section applied to the power supply system to which the fuel cell adopting the reformed fuel supply mode is applied.

As shown in FIG. 6, the power supply system to which the fuel cell in the conventional technology is applied roughly includes a fuel supply section 310 in which a power generation fuel such as methanol is stored or enclosed, a chemical reacting section 320 that reforms the power generation fuel to generate a power generation gas mainly containing hydrogen gas, and a power generation cell section 330 that generates and outputs electrical energy based on an electrochemical reaction using the generated hydrogen gas and oxygen in the atmosphere.

Here, as shown in, e.g., FIGS. 6 and 7, the chemical reacting section 320 includes at least a vaporizer (a fuel vaporizer) 321 that evaporates (vaporizes) an aqueous solution consisting of a power generation fuel (e.g., methanol $CH_3OH$) and water ($H_2O$) to generate a fuel gas, a reformer 322 that modifies the fuel gas based on a reforming reaction to generate a power generation gas containing hydrogen ($H_2$), and a carbon monoxide remover (which will be referred to as a "CO remover" hereinafter) 323 that converts harmful carbon monoxide (CO) in carbon dioxide ($CO_2$) and a small amount of carbon monoxide (CO) produced as byproducts in the reforming reaction into carbon dioxide $CO_2$ based on a selective oxidation reaction and removes the converted carbon dioxide $CO_2$.

In such a structure, when the hydrogen gas having a high concentration generated by the chemical reacting section 320 is supplied to an anode side of the power generation cell section 330, hydrogen ions and electrons are generated from the hydrogen. When the hydrogen ions are transmitted through a proton exchange membrane interposed between the anode and a cathode to be coupled with oxygen molecules (oxygen in the atmosphere) on the cathode side, the electrons that move from the anode side toward the cathode side are output to generate electrical energy. It is to be noted that a specific chemical reaction in the chemical reacting section and the power generation cell section will be explained in detail in a section of "the detailed description of the invention".

Meanwhile, in the power supply system to which the fuel cell adopting the reformed fuel supply mode is applied, the amount of hydrogen gas supplied from the chemical reacting section 320 to the power generation cell section 330 must be kept constant to stably drive a load connected with the power supply system. Here, a generation state of the hydrogen gas in the chemical reacting section 320 (a progress state of a reforming reaction in the reformer 322) is controlled under temperature conditions set with respect to the chemical reacting section 320 including the reformer 322. Therefore, the chemical reacting section 320 must be set to a predetermined high-temperature state, this state must be maintained, and the progress state of the reforming reaction in the reformer 322 must be held in a predetermined status in order to keep the amount of hydrogen gas generated by the chemical reacting section 320 constant.

Here, as a method of maintaining the chemical reacting section 320 in a predetermined high-temperature state (a fixed temperature), the following technique or the like is known. That is, for example, in a power generating operation (an electrochemical reaction) in the power generation cell section 330, heating is performed by using combustion heat obtained by burning an off-gas containing remaining unreacted hydrogen in a catalyst combustor (not shown) provided near the chemical reacting section 320 or heat obtained from an electric heater (not shown) or the like to set a predetermined high-temperature state.

Specifically, in the technique of setting the chemical reacting section 320 (the reformer 322) to the predetermined high-temperature state (a fixed temperature) by using combustion heat from the off-gas, controlling the amount of off-gas or oxygen supplied to an off-gas combustor allows setting a degree of burning the off-gas (an amount of generated combustion heat), thereby controlling a generation state of the hydrogen gas (a progress state of a reforming reaction) in the chemical reacting section 320 (the reformer 322).

However, a power supply system adopting a structure and a method of controlling a temperature state of the chemical reacting section (the reformer) by using combustion heat from the off-gas is set to supply hydrogen whose amount is larger than a sum total of an amount of hydrogen required for the power generating operation and an amount of hydrogen required as a thermal energy in a hydrogen generating operation in the chemical reacting section (the reformer) in order to stably output fixed electrical energy (a current) based on the power generating operation in the power generation cell section. That is, an amount of hydrogen in the off-gas discharged from the power generation cell section is set to be greatly larger than an amount consumed in the off-gas combustor (i.e., an amount required by the reformer to generate a thermal energy).

Here, of hydrogen generated by the chemical reacting section (the reformer), hydrogen that is not utilized in the power generating operation (an electrochemical reaction) and the hydrogen generating operation (combustion of the off-gas) cannot be discharged to the outside of the system as it is. Therefore, this hydrogen must be burned in, e.g., a residual gas burner to be converted (consumed) into water.

Therefore, the power supply system has a problem that a part of the hydrogen generated from the power generation fuel is wastefully consumed, thereby lowering a power generation efficiency (an energy conversion efficiency). Further, the residual gas burner and its peripheral devices (e.g., a valve or a flowmeter) must be additionally provided, and hence the power supply system also has a problem of an increase in a system scale, complication of control, an increase in a product cost and others.

BRIEF SUMMARY OF THE INVENTION

In a power supply system that receives a power generation fuel to produce a power generation gas containing hydrogen and supplies the generated gas to a power generating section to perform a power generating operation, a control apparatus of the power supply system, and a control method of the power supply system, the present invention has an advantage that the generated hydrogen can be effectively utilized to improve a power generation efficiency without an increase in a system scale, complication of control, or an increase in a product cost.

To obtain the advantage, the power supply system according to the present invention includes: a chemical reacting section that receives a power generation fuel and reforms this fuel by a chemical reaction to generate a power generation gas containing hydrogen; a power generating section that receives the power generation gas, reacts a part of the power generation gas to generate electrical energy, supplies the generated electrical energy to a load, and discharges an unreacted component in the power generation gas as an off-gas; a heating section that receives the off-gas, uses the off-gas to produce a thermal energy, and heats the chemical reacting section; an output control section that controls an amount of electrical energy output from the power generating section; and a control section that controls an amount of electrical energy output from the power generating section by the output control section to change a temperature of the chemical reacting section set based on the thermal energy produced by the heating section to a predetermined temperature.

The power supply system further includes a temperature measuring section that measures a temperature of the chemical reacting section. The temperature measuring section also functions as an electric heater that produces a thermal energy to heat the chemical reacting section. Control over the amount of electrical energy output from the power generating section by the control section is carried out based on a temperature of the chemical reacting section measure by the temperature measuring section.

The chemical reacting section has a reformer that generates the power generation gas based on a reforming reaction. The predetermined temperature is a temperature suitable for the reforming reaction in the reformer section. The control section includes temperature comparing means for comparing a temperature of the chemical reacting section measured by the temperature measuring section with the predetermined temperature, and controls the amount of electrical energy output from the power generating section based on a comparison result obtained by the temperature comparing means.

The heating section generates the thermal energy based on a combustion reaction using hydrogen contained in the off-gas. An amount of hydrogen in the off-gas varies in accordance with the amount of electrical energy output from the power generating section controlled by the output control section. The amount of thermal energy generated by the heating section is set in accordance with an amount of hydrogen contained in the off-gas.

The output control section controls a current value of an output current output from the power generating section in accordance with the amount of electrical energy output from the power generating section. The control section includes a current value judging section that judges whether a current value of the output current output from the power generating section falls within a range where the power generating section demonstrates specific power generation characteristics.

The power supply system further includes: a voltage converting section that converts the electrical energy output from the power generating section to produce a load driving power having a predetermined voltage value and current value, and supplies the generated load driving power to the load; and a power holding section that stores the electrical energy output from the power generating section. The voltage converting section converts the electrical energy stored in the power holding section to produce the load driving power.

The control section includes a voltage value judging section that detects a voltage value of an output voltage from the power generating section when the electrical energy is output from the power generating section and judges whether the voltage value of the output voltage falls within a range where the power generating section demonstrates specific power generation characteristics.

The chemical reacting section includes: a vaporizer that receives the power generation fuel and water and vaporizes the supplied power generation fuel and water; and a reformer that receives the vaporized power generating fuel and water generated by the vaporizer, and produces a gas containing hydrogen as the power generation gas based on a catalytic reaction. The power generation fuel is a liquid fuel containing hydrogen atoms in its composition, and the heating section supplies the thermal energy to the fuel reformer.

The power generating section is, e.g., a proton-exchange membrane fuel cell that generates the electrical energy based on an electrochemical reaction using hydrogen contained in the power generation gas.

To obtain the advantage, the control apparatus of the power supply system according to the present invention is a control apparatus of a power supply system that includes: a chemical reacting section that receives a power generation fuel and reforms the power generation fuel by a chemical reaction to produce a power generation gas containing hydrogen; a power generating section that receives the power generation gas and reacts a part of the power generation gas to produce electrical energy; and a heating section that receives an off-gas discharged from the power generating section, uses the off-gas to produce a thermal energy, and heats the chemical reacting section. The control apparatus includes: an output control section that controls an amount of electrical energy output from the power generating section; and a control section that controls an amount of electrical energy output from the power generating section by the output control section to change a temperature of the chemical reacting section set based on the thermal energy generated by the heating section to a predetermined temperature.

The control apparatus further includes a temperature measuring section that measures a temperature of the chemical reacting section. Control over the amount of electrical energy output from the power generating section by the control section is carried out based on a temperature of the chemical reacting section measured by the temperature measuring section.

The predetermined temperature is a temperature suitable for the chemical reaction in the chemical reacting section. The control section controls the amount of electrical energy output from the power generating section based on a magnitude of a difference between a temperature of the chemical reacting section measured by the temperature measuring section and the predetermined temperature.

The output control section controls a current value of an output current output from the power generating section in accordance with the amount of electrical energy output from the power generating section. The control section includes a current value judging section that judges whether a current value of the output current falls within a range where the power generating section demonstrates specific power generation characteristics.

The control section includes a voltage value judging section that detects a voltage value of an output voltage from the power generating section when the electrical energy is output from the power generating section and judges whether the voltage value of the output voltage falls within a range where the power generating section demonstrates specific power generation characteristics.

To obtain the advantage, the control method of the power supply system according to the present invention is a control method of a power supply system that includes: a chemical reacting section that receives a power generation fuel and reforms the power generation fuel by a chemical reaction to produce a power generation gas containing hydrogen; a power generating section that receives the power generation gas and reacts a part of the power generation gas to produce electrical energy; and a heating section that receives an off-gas discharged from the power generating section, uses the off-gas to produce a thermal energy, and heats the chemical reacting section. The control method includes: an operation of measuring a temperature of the chemical reacting section; and an operation of controlling an amount of electrical energy output from the power generating section in accordance with a measured temperature of the chemical reacting section to change the temperature of the chemical reacting section set based on the thermal energy generated by the heating section to a predetermined temperature.

The operation of controlling an amount of electrical energy output from the power generating section includes an operation of comparing the measured temperature of the chemical reacting section with the predetermined temperature and increasing/decreasing the amount of electrical energy output from the power generating section in accordance with a magnitude of a difference between the temperature of the chemical reacting section and the predetermined temperature.

The operation of controlling the amount of electrical energy output from the power generating section includes: an operation of controlling a current value of an output current output from the power generating section in accordance with the amount of electrical energy output from the power generating section; and an operation of judging whether a current value of the output current output from the power generating section falls within a range where the power generating section demonstrates specific power generation characteristics. The operation of controlling the amount of electrical energy output from the power generating section further includes an operation of returning a current value of the output current output from the power generating section to the range where the power generating section demonstrates specific power generation characteristics when it is determined that the current value of the output current output from the power generating section is out of the range where the power generating section demonstrates the specific power generation characteristics.

The operation of controlling the amount of electrical energy output from the power generating section includes an operation of detecting a voltage value of an output voltage from the power generating section when the electrical energy is output from the power generating section and judging whether the voltage value of the output voltage falls within a range where the power generating section demonstrate specific power generation characteristics. The operation of controlling the amount of electrical energy output from the power generating section further includes an operation of controlling a current value of an output current output from the power generating section in such a manner that a voltage value of the output voltage falls within a range where the power generating section demonstrates specific power generation characteristics when it is determined that the voltage value of the output voltage is out of the range where the power generating section demonstrates the specific power generation characteristics.

DETAILED DESCRIPTION OF THE INVENTION

A power supply system, a control apparatus of the power supply system, and a control method of the power supply system according to the present invention will now be explained in detail hereinafter based on an illustrated embodiment.

<Power Supply System>

Structures of a power supply system and a control apparatus thereof according to the present invention will be first explained.

Figure 1:
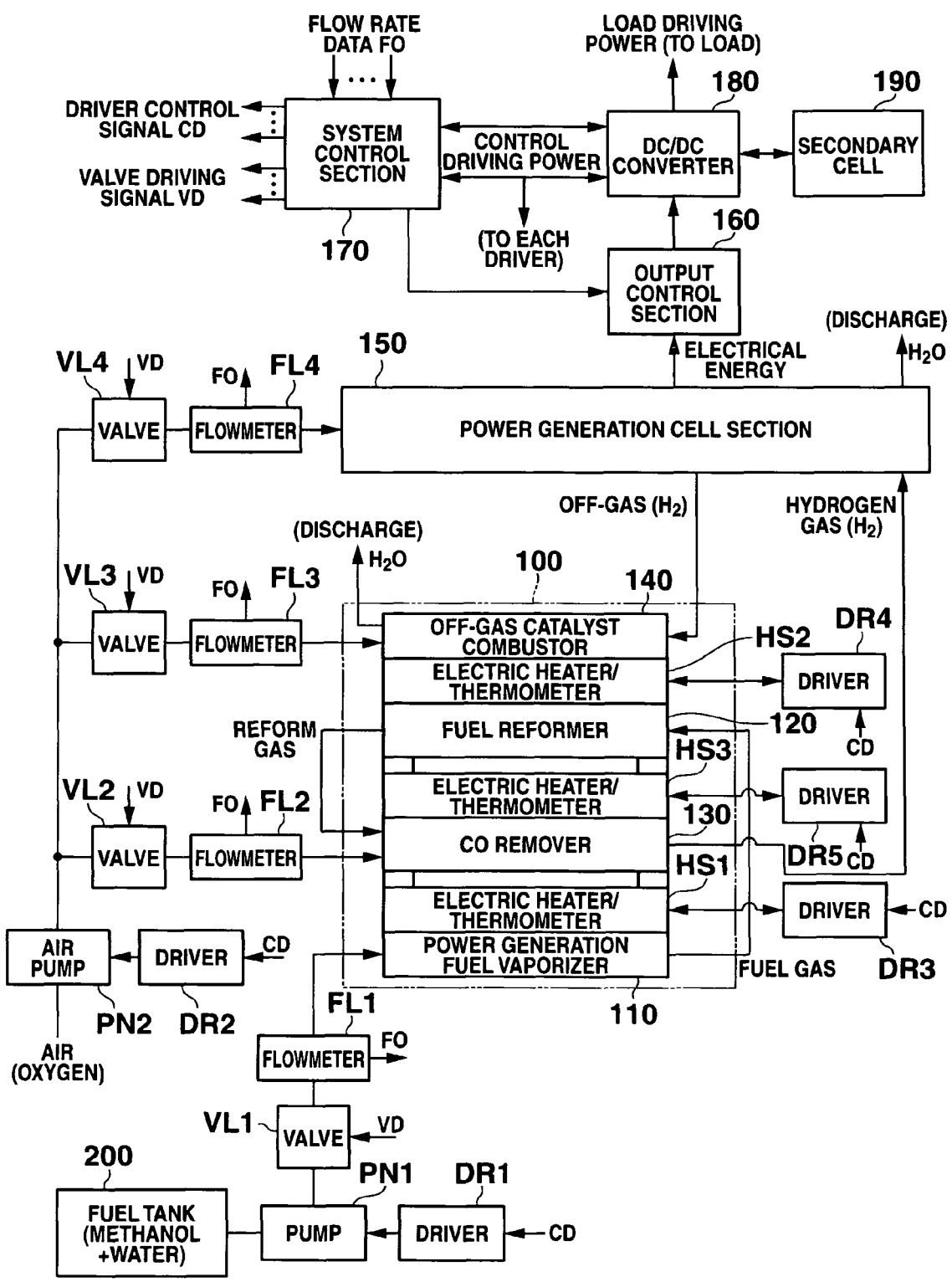
FIG. 1 is a schematic block diagram showing an embodiment of a power supply system and a control apparatus thereof according to the present invention.

FIG. 1 is a schematic block diagram showing an embodiment of the power supply system and the control apparatus thereof according to the present invention.

It is to be noted that an example of using methanol as a power generation fuel will be described herein.

As shown in FIG. 1, the power supply system according to a first embodiment has a structure roughly including: a fuel tank 200 in which a mixed liquid (a methanol solution) containing methanol $CH_3OH$ and water $H_2O$ as a power generation fuel is enclosed; a chemical reacting section 100 that generates hydrogen $H_2$ based on a series of chemical reactions (which will be described later in detail) using the methanol $CH_3OH$, water $H_2O$ and oxygen $O_2$ in the atmosphere; a power generation cell section (a fuel cell; a power generating section) 150 formed of a fuel cell that generates and outputs electrical energy based on an electrochemical reaction using hydrogen $H_2$ fed from the chemical reacting section 100 and oxygen $O_2$ in the atmosphere; an output control section 160 that controls a current value of an output current corresponding to the electrical energy generated by the power generation cell section 150 and output as an output based on a control signal (a current control value) from a later-described system control section 170; a DC/DC converter (a voltage converting section) 180 that converts the electrical energy output from the power generation cell section 150 into a desired voltage value and controls storage of the electrical energy in a secondary cell 190 or output of the electrical energy to a load; the secondary cell (a storage section) 190 such as an accumulator that stores the electrical energy output from the power generation cell section 150; and the system control section (a control section) 170 that controls an operation in each structure to further control a driving state of the power supply system (which is mainly a progress state of a chemical reaction (a reforming reaction) in the chemical reacting section 100 or a power generating operation in the power generation cell section 150).

Each structure will now be explained in detail hereinafter.

(Chemical Reacting Section)

As shown in FIG. 1, the chemical reacting section 100 specifically includes a power generation fuel vaporizer 110 that heats and vaporizes (evaporates) the methanol solution fed from the fuel tank 200 to generate a fuel gas consisting of a methanol gas and moisture vapor; a fuel reformer 120 that generates a power generation gas containing hydrogen $H_2$ based on a catalytic reaction (a steam reform reaction) using the fuel gas; a CO remover 130 that removes carbon monoxide CO to generate carbon dioxide $CO_2$ based on a catalytic reaction (a selective oxidizing reaction) using oxygen $O_2$ and carbon monoxide CO which is generated as a byproduct when generating hydrogen gas in the catalytic reaction in the fuel reformer 120; an off-gas catalyst combustor (a heating section) 140 that generates a thermal energy required to promote or maintain each chemical reaction in at least the power generation fuel vaporizer 110, the fuel reformer 120, and the CO remover 130 based on a catalytic combustion reaction using oxygen $O_2$ in the atmosphere and an off-gas containing an unreacted hydrogen gas $H_2$ that is not used for an electrochemical reaction in the power generation cell section 150 in the hydrogen gas $H_2$ supplied to the power generation cell section 150 in a steady state of the power supply system; electric heaters/thermometers (temperature measuring sections) HS1, HS2, and HS3 that use the electrical energy stored in the secondary cell 190 at the time of activating the power supply system to generate thermal energies required to promote or maintain each chemical reaction in at least the power generation fuel vaporizer 110, the fuel reformer 120, and the CO remover 130 and measure temperature states in the power generation fuel vaporizer 110, the fuel reformer 120, and the CO remover 130.

Furthermore, a fluid pump PN1 that supplies (discharges) the methanol solution from the fuel tank 200, a control driver DR1 that controls a driving state of the fluid pump PN1, a fluid valve VL1 that sets a supply amount of the methanol solution to the power generation fuel vaporizer 110, and a flowmeter FL1 that detects the supply amount are provided in a fuel supply path between the fuel tank 200 and the power generation fuel vaporizer 110.

Moreover, since various kinds of chemical reactions (a catalytic reaction, an electrochemical reaction and others) in the CO remover 130, the off-gas catalyst combustor 140, and the power generation cell section 150 require oxygen, an air pump PN2 that takes in and supplies air in the atmosphere, a control driver DR2 that controls a driving state of the air pump PN2, fluid valves VL2, VL3, and VL4 that set a supply amount of oxygen to each of the CO remover 130, the off-gas catalyst combustor 140, and the power generation cell section 150, and flowmeters FL2, FL3, and FL4 that measure the supply amount are provided.

Here, the respective control drivers DR1 and DR2 control driving states in the pumps PN1 and PN2 based on a command (a control signal CD) from the system control section 170. Additionally, the flowmeters FL1 to FL4 output to the system control section 170 flow rate data FO of the methanol solution and air supplied to each structure.

The respective electric heaters/thermometers HS1 to HS3 are provided to be adjacent to or appressed against the power generation fuel vaporizer 110, the fuel reformer 120, and the CO remover 130, and generate thermal energies suitable for promoting respective chemical reactions in the power generation fuel vaporizer 110, the fuel reformer 120 and the CO remover 130 in activation of the power supply system. Control drivers DR3, DR4, and DR5 that control to measure temperatures in the power generation fuel vaporizer 110, the fuel reformer 120, and the CO remover 130 realized by the thermal energies are individually connected with the electric heaters/thermometers HS1 to HS3. The respective control drivers DR3 to DR5 adjust thermal energies to be discharged while monitoring temperatures detected by the respective electric heaters/thermometers HS1 to HS3 based on a command (a control signal CD) from the system control section 170.

It is to be noted that, in the power supply system having the above-described structure, for example, a semiconductor device manufacturing technology may be applied to form a fine groove as a reaction duct in an insulative substrate, or a plurality of barriers each of which is constituted of a thin metallic plate may be provided to form a reaction duct, or a predetermined catalytic agent may be applied to an inner wall of the duct to be constituted as a fine chemical reactor (a micro-reactor) in each of the off-gas catalyst combustor 140, the fuel reformer 120, the CO remover 130, and the power generation fuel vaporizer 110 in the chemical reacting section 100 according to this embodiment.

Further, as each of the electric heaters/thermometers HS1 to HS3, a member having, e.g., a thin film resistance material appressed against to each of the above-described structures can be applied.

Furthermore, it is possible to adopt a structure in which each chemical reactor and a thin film resistor are sequentially superimposed. For example, as shown in FIG. 1, a first unit has the electric heater/temperature indicator HS1 and the power generation fuel vaporizer 110 superimposed therein, a second unit has the electric heater/temperature indicator HS2 and the fuel reformer 120 superimposed therein, and a third unit has the electric heater/temperature indicator HS3 and the CO remover 130 superimposed therein. These units are superimposed in an appropriate order (FIG. 1 shows a structure in which the first, the second and the third units are superimposed in the mentioned order). These units are connected with each other through a duct such as a pipe, and the obtained configuration is enclosed in a vacuum insulating container.

Here, the duct is formed in such a manner that an outlet of the power generation fuel vaporizer 110 is connected with a supply port of the fuel reformer 120, an outlet of the fuel reformer 120 is connected with a supply port of the CO remover 130, and an outlet of the CO remover 130 is connected with the power generation cell section 150.

It is to be noted that the description has been given on the structure where the mixed liquid (the methanol solution) of methanol and water is enclosed in the fuel tank 200 and this is supplied to the power generation fuel vaporizer 110 in this embodiment. However, the present invention is not restricted thereto. For example, methanol and water may be enclosed in individual tanks (i.e., a methanol tank and a water tank), and methanol and water may be supplied to the power generation fuel vaporizer 110 from these tanks through a pump, a control driver, a fluid valve, and a flowmeter that are individually provided (i.e., individual supply systems).

A series of chemical reactions (heating and vaporizing processing, a steam reform reaction, and a selective oxidizing reaction) to generate hydrogen gas in the chemical reacting section 100 (the power generation fuel vaporizer 110, the fuel reformer 120, and the CO remover 130) will now be specifically explained.

First, in an vaporization process in the power generation fuel vaporizer 110, the electric heater/temperature indicator HS1 is controlled when activating the power supply system. Further, in a s steady state where a power generating operation in the power supply system (the power generation cell section 150) is stabilized, a catalytic combustion reaction of an off-gas in the off-gas catalyst combustor 140 is controlled to set temperature conditions of the power generation fuel vaporizer 110 to a temperature that is not lower than a boiling point (e.g., approximately 120° C.) of the mixed liquid (the methanol solution) of methanol $CH_3OH$ and water $H_2O$. As a result, the mixed liquid is heated and vaporized, thereby generating a fuel gas.

Then, in a steam reform reaction process in the fuel reformer 120, like the vaporization process, a power generation gas containing hydrogen $H_2$ is generated from the fuel gas based on the thermal energy supplied from the electric heater/temperature indicator HS2 or the off-gas catalyst combustor 140 by setting a temperature condition that is 250° C. to 400° C. or, preferably, approximately 270° C. to 300° C. as represented by the following chemical reaction expression (1). It is to be noted that, as shown in (a) in FIG. 7, carbon dioxide $CO_2$ and a small amount of carbon monoxide CO are generated as by-products other than hydrogen $H_2$ in this steam reform reaction.

$$CH_3OH + H_2O \rightarrow 3H_2 + CO_2 \qquad (1)$$

Figure 7:
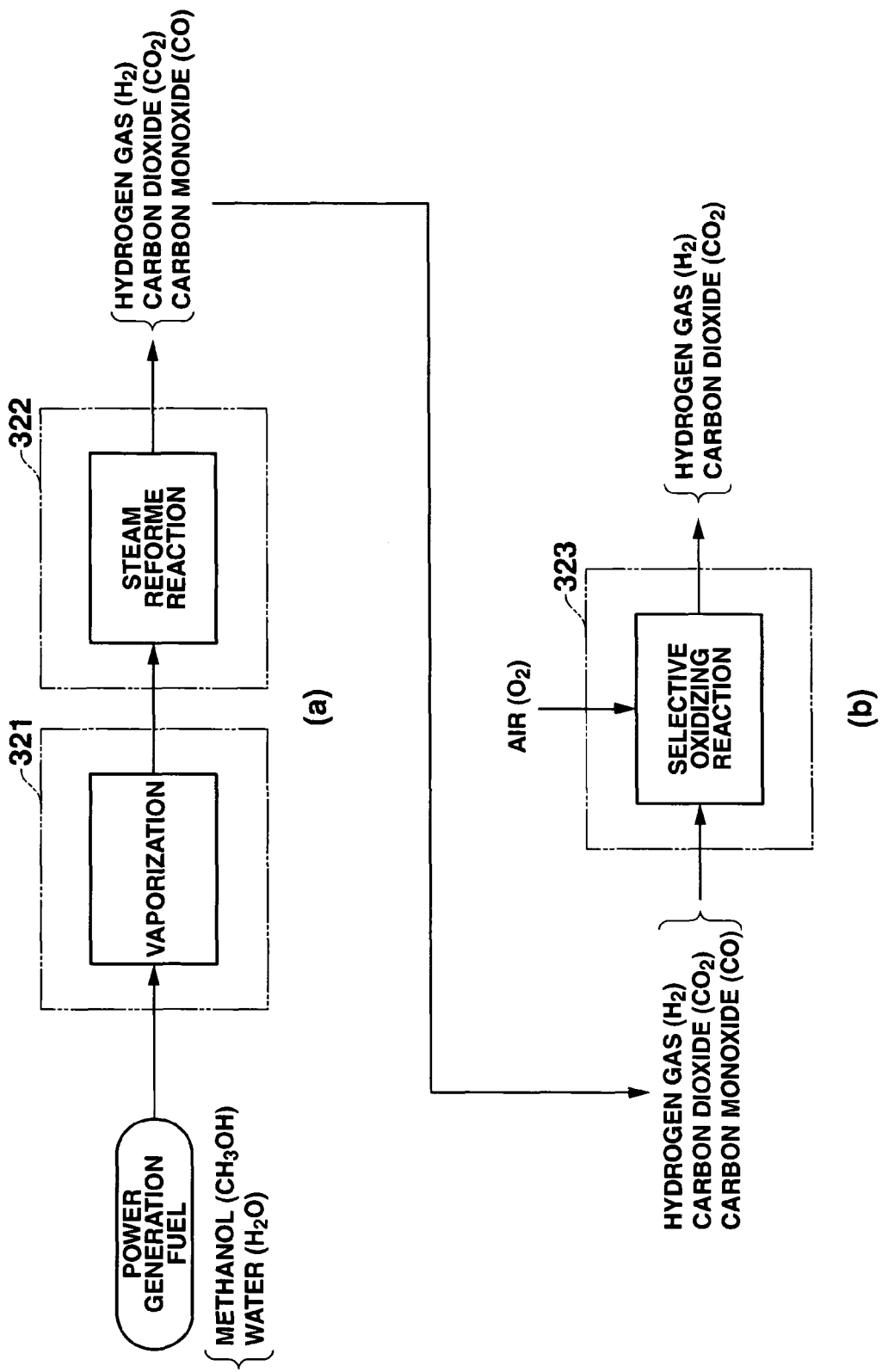
FIG. 7 is a schematic view showing an example of a chemical reaction in a fuel reforming section applied to the power supply system to which the fuel cell adopting the reformed fuel supply mode is applied.

In order to remove such harmful by-products, in a CO removal process in the CO remover 130, like the vaporization process, oxygen $O_2$ in the atmosphere is reacted with respect to carbon monoxide CO to effect a selective oxidizing reaction that generates carbon dioxide $CO_2$ based on the thermal energy supplied from the electric heater/temperature indicator HS3 or the off-gas catalyst combustor 140 as represented by the following chemical reaction expression (2) by setting a temperature condition that is 120° C. to 200° C. or, preferably, approximately 140° C. to 180° C. as shown in (b) in FIG. 7.

$$CO + (1/2)O_2 \rightarrow CO_2 \qquad (2)$$

As a result, the chemical reacting section 100 reforms the mixed liquid (the methanol solution) containing methanol $CH_3OH$ (the power generation fuel) and water $H_2O$ fed from the fuel tank 200 to produce hydrogen gas $H_2$ having a high purity (a high concentration, 70 to 75%).

(Power Generation Cell Section)

Figure 2:
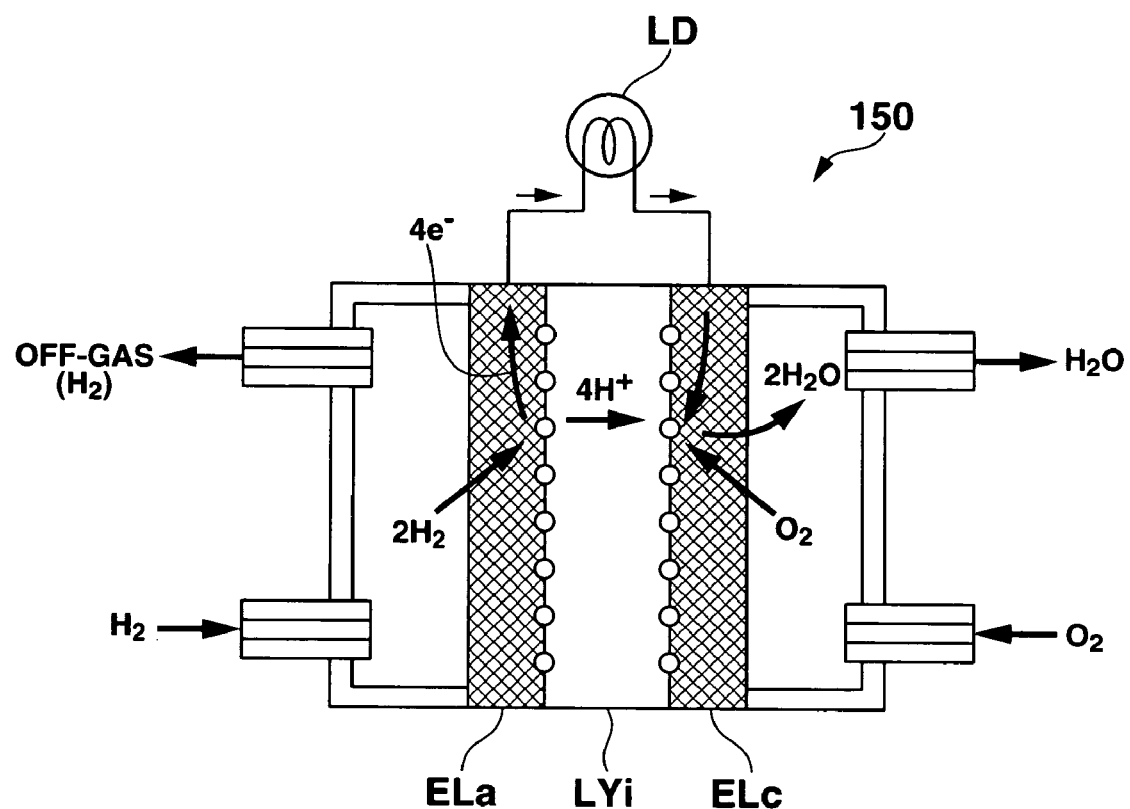
FIG. 2 is a schematic block diagram showing an example of a power generation cell section applied to the power supply system according to this embodiment.

FIG. 2 is a schematic block diagram showing an example of the power generation cell section applied to the power supply system according to this embodiment. An example where a known proton-exchange membrane fuel cell is applied as an example of the fuel cell constituting the power generation cell section will be explained herein.

As shown in FIG. 2, the power generation cell section 150 has an anode ELa formed of a carbon electrode having catalyst fine particles of, e.g., platinum or platinum ruthenium adhered thereto, a cathode ELc formed of a carbon electrode having catalyst fine particles of platinum or the like adhered thereto, and a film-like proton exchange membrane (an ion-exchange membrane) LYi inserted between the anode ELa and the cathode ELc. The power generation cell section 150 is constituted in such a manner that the hydrogen gas $H_2$ having a high purity (a high concentration) obtained by reforming the power generation fuel (methanol CH₃OH) in the chemical reacting section 100 is supplied to the anode ELa side and, on the other hand, oxygen O2 in the atmosphere taken in by the air pump PN2 is constantly supplied at a predetermined flow rate to the cathode ELc side through the fluid valve VL4 and the flowmeter FL4.

Here, in the power generation cell section 150 according to this embodiment, the fuel gas obtained by vaporizing the methanol solution output from the fuel tank 200 is supplied to the fuel reformer 120 where this fuel gas is reformed, and the hydrogen gas H₂ having a high concentration alone that is obtained by removing carbon monoxide CO in the CO remover 130 is fed to the anode ELa.

Furthermore, in regard to an electrochemical reaction concerning the power generating operation in the power generation cell section 150 having such a configuration, when the hydrogen gas H2 is supplied to the anode ELa, as represented by the following chemical reaction expression (3), electrons e⁻ are separated to produce hydrogen ions H⁺ by a catalytic reaction, and these ions are transmitted through the cathode ELc side via the proton exchange membrane LYi. The electrons e⁻ are output and supplied to the load LD by the carbon electrode constituting the anode ELa.

$$H_2 \rightarrow 2H^+ + 2e^- \tag{3}$$

On the other hand, when oxygen O₂ in the air is supplied to the cathode ELc, the electrons e⁻ passed through the load LD react with the hydrogen ions H⁺ and oxygen O₂ transmitted through the proton exchange membrane LYi by the catalytic substance as represented by the following chemical reaction expression (3), thereby producing water H₂O as a by-product.

$$2H^+ + \tfrac{1}{2}O_2 + 2e^- \rightarrow H_2O \tag{4}$$

Here, the series of electrochemical reactions represented in the chemical reaction expressions (3) and (4) proceed under temperature conditions of a relatively low temperature that is approximately 60 to 80° C. Hydrogen H₂ supplied to the anode ELa reacts to be consumed and converted into electrical energy based on such electrochemical reactions. However, a percentage of consumption in the supplied hydrogen H₂ (a hydrogen utilization factor) is dependent on the amount of electrical energy output from the power generation cell section 150, and hydrogen H2 that is not consumed and remains as unreacted hydrogen is discharged as an off-gas. Here, when taking out the electrical energy from the power generation cell section 150, in order appropriately perform the electrochemical reaction in the power generation cell section 150 and prevent the power generation cell from being damaged or deteriorated, a value of the hydrogen utilization factor has a proper range. As will be describe later, the hydrogen utilization factor is usually set to fall within a range of 75% to 95%. When taking out a current corresponding to the electrical energy from the power generation cell section 150 in accordance with this range, a current value is restricted in a range from a predetermined later-described minimum current value to a maximum current value. A power output from the power generation cell section 150 is restricted to fall within a range that is not smaller than a later-described predetermined minimum power value. An output voltage from the power generation cell section 150 is set to fall within a range that is not smaller than a later-described minimum voltage value. When these ranges are exceeded, an electrical energy generating operation in the power generation cell section 150 becomes unstable.

It is to be noted that the off-gas discharged from the power generation cell section 150 is supplied to the off-gas catalyst combustor 140 in the chemical reacting section 100, converted into a thermal energy based on a catalytic combustion reaction, and utilized to set and maintain a temperature state (a fixed temperature suitable for each chemical reaction) in each of the fuel reformer 120, the CO remover 130, and the power generation fuel vaporizer 110 as described above.

(Output Control Section)

Figure 3:
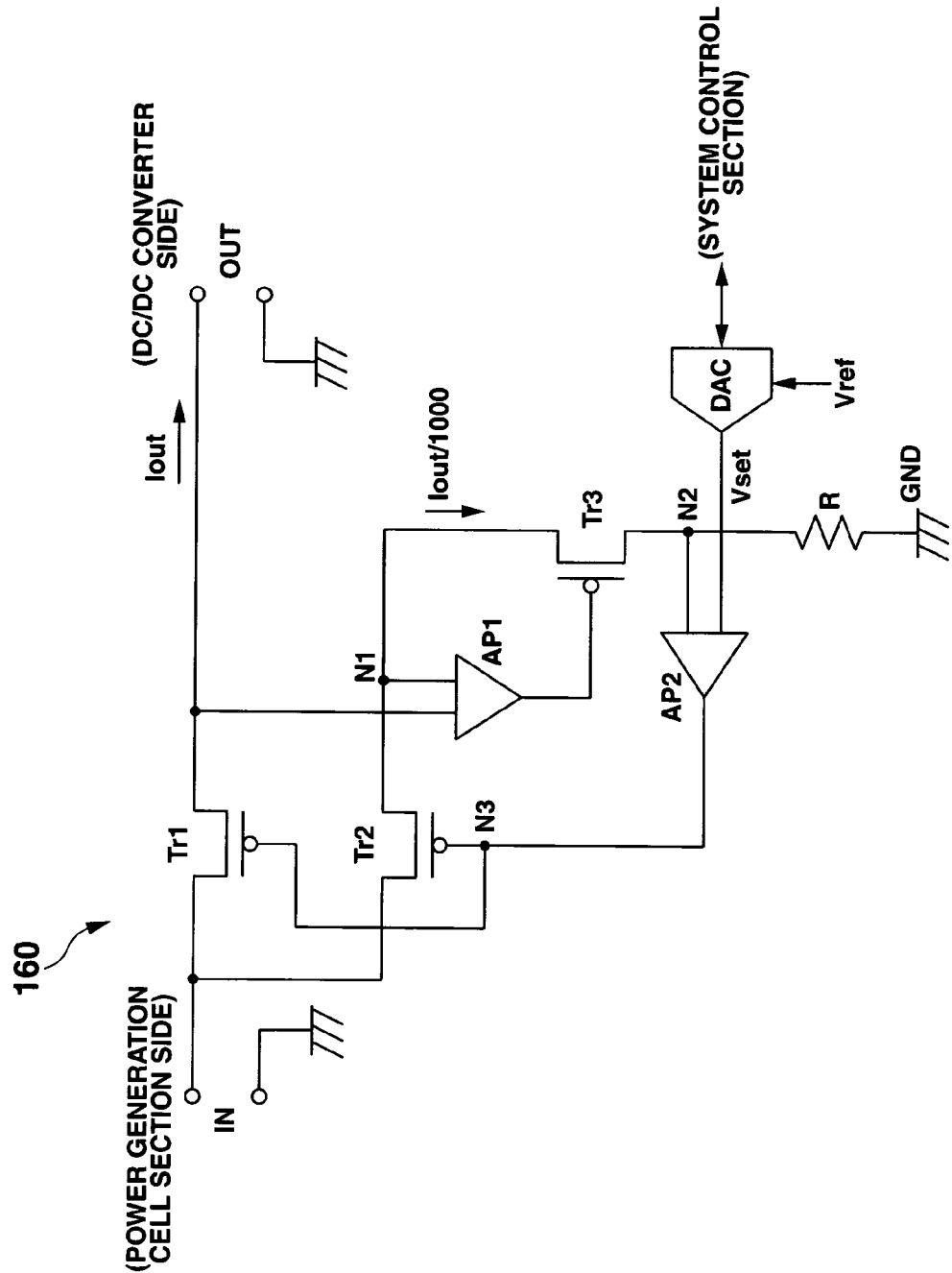
FIG. 3 is a schematic circuit block diagram showing an example of an output current control section applied to the power supply system according to this embodiment.

FIG. 3 is a schematic circuit block diagram showing an example of the output control section applied to the power supply system according to this embodiment.

The output control section 160 is provided in an electrical energy output section of the power generation cell section 150. For example, as shown in FIG. 3, the output control section 160 includes: a p-channel type transistor (a field-effect transistor) Tr1 having a current path connected thereto between an input-side contact point IN connected with the power generation cell section 150 and an output-side contact point OUT connected with a load of an electronic device or the like via a DC/DC converter 180; p-channel type transistors Tr2 and Tr3 and a resistance element R having respective current paths connected thereto in series between the input-side contact point IN and a ground potential GND; a comparator (an amplifier) AP1 having one input terminal connected with the output-side contact point OUT, the other input terminal connected with a connection contact point (a contact point N1) of the transistors Tr2 and Tr3, and an output terminal connected with a gate terminal of the transistor Tr3; a digital-to-analog converter DAC that subjects a control signal (a current control value) formed of a digital signal output from the system control section 170 to digital-to-analog conversion to generate a set voltage Vset; and a comparator AP2 having one input terminal connected with a connection contact point (a contact point N2) of the thin film transistor Tr3 and the resistance element R, the other input terminal to which the set voltage Vset output from the digital-to-analog converter DAC is applied, and an output terminal (a contact point N3) connected with gate terminals of the transistors Tr2 and Tr3.

In the output control section 160 having such a circuit configuration, a current of, e.g., 1/1000 (Iout/1000) is set to flow through the ground potential GND via the resistance element R with respect to an output current (i.e., a current value corresponding to electrical energy output from the power generation cell section 150) Iout flowing through the output-side contact point OUT by the comparator AP1 and the transistor Tr3. A potential at the contact point N2 generated when the current flows through the resistance element R is applied to the one input terminal of the comparator AP2. Moreover, a set voltage (an analog voltage) Vset generated by the digital-to-analog converter DAC is applied to the other input terminal of the comparator AP2 based on a control signal (a current control value) formed of a digital signal output from the system control section 170.

As a result, the comparator AP2 controls electrical conduction states (on and off) of the transistors Tr1 and Tr2 based on an output potential (a potential at the contact point N3) obtained by comparing a potential at the contact point N2 with the set voltage Vset. Therefore, the current value (the output current Iout) corresponding to the electrical energy output from the power generation cell section 150 is gradually controlled (step control) based on the control signal (the current control value) consisting of the digital signal output from the system control section 170. That is, the transistor Tr1 functions as a load with respect to the power generation cell section 150 so that a magnitude of a load with respect to the power generation cell section 150 is controlled in accordance with an output from the comparator AP2. The output control section 160 serves as a so-called electronic load with respect to the power generation cell section 150.

Here, in the output control section 160 according to this embodiment, when the output current Iout exceeds a current value (a set current) Ilim set based on the control signal (the current control value), the output current Iout is controlled to have the same current value as the set current Ilim (Iout=Ilim), and the current value of the output current Iout is controlled to not exceed the set value Ilim. It is to be noted that, when a resistance value of the resistance element R is 1 k$\Omega$, a relationship between the set current Ilim and the set voltage Vset generated based on the control signal is represented by the following expression.

$$Ilim/1000 = Vset/R \rightarrow Ilim\ (=Iout) = 1000 \times Vset/R$$

It is to be noted that the output control section 160 provided in the output section of the power generation cell section 150 in the power supply system according to the present invention is not restricted to the circuit configuration depicted in FIG. 3. It is needless to say that the output control section 160 may have other circuit configurations as long as it has the equivalent function of controlling a current value of the output current Iout based on a control signal from the system control section 170.

Additionally, although FIG. 1 depicts the output control section 160 as an independent structure, the present invention is not restricted thereto. The output control section 160 may be integrally configured with, e.g., the DC/DC converter 180. In this case, a control signal (a current control value) output from the system control section 170 is input to, e.g., the digital-to-analog converter DAC in the output control section 160 via the DC/DC converter 180.

(DC/DC Converter/Secondary Cell)

In a steady operation of the power supply system, the DC/DC converter 180 converts electrical energy output from the power generation cell section 150 to generate a load driving power having a predetermined voltage value and current value, supplies the generated power to a load of an electronic device or the like, produces a control driving power to be output to the system control section 170 or the respective drivers DR1 to DR5, and charges the secondary cell 190 by using the converted voltage so that the electrical energy is stored in the secondary cell 190. Furthermore, for example, in activation or a temporarily overloaded state of the power supply system, the electrical energy stored in the secondary cell 190 is used to produce a load driving power to be supplied to a load of an electric device or the like, and a control driving power is generated to be output to the system control section 170 or the respective drivers DR1 to DR5. It is to be noted that, as the secondary cell 190, known various accumulator batteries may be applied, or an electric double layer capacitor or the like that can be reduced in thickness and weight and is superior in charge/discharge characteristics may be applied.

(System Control Section)

The system control section 170 includes, e.g., a CPU, a ROM, a RAM, an analog-to-digital converter, a digital-to-analog converter and others that are not illustrated, and controls operations in the respective structures.

Specifically, the system control section 170 supplies a predetermined amount of the methanol solution to the power generation fuel vaporizer 110 at a predetermined timing from the fuel tank 200 via the fluid pump PN1, the fluid valve VL1 and the flowmeter FL1 based on, e.g., an operation of activating the power supply system by a user, and sets the power generation fuel vaporizer 110 to a predetermined temperature state, thereby controlling an operation state in the vaporization process (a fuel vaporizing operation) of vaporizing the methanol solution to generate a fuel gas.

Moreover, the system control section 170 sets the fuel reformer 120 to a predetermined temperature state to control an operation state in the steam reform reaction process (a fuel reforming operation) of reforming the fuel gas (methanol $CH_3OH$ and water $H_2O$) generated in the power generation fuel vaporizer 110 to generate a power generation gas containing hydrogen $H_2$.

Additionally, the system control section 170 supplies a predetermined amount of oxygen $O_2$ to the CO remover 130 at a predetermined timing via the air pump PN2, the fluid valve VL2 and the flowmeter FL2. Further, the system control section 170 sets the CO remover 130 to a predetermined temperature state to control an operation state of a CO removal process constituted of the selective oxidizing reaction of removing carbon monoxide CO in the power generation gas generated by the fuel reformer 120 to generate hydrogen gas $H_2$ having a high concentration.

Furthermore, the system control section 170 supplies a predetermined amount of oxygen $O_2$ to the cathode ELc side at a predetermined timing via the air pump PN2, the fluid valve VL4, and the flowmeter FL4 with respect to the power generation cell section 150 in which the hydrogen gas having a high concentration generated through the CO remover 130 is directly supplied to the anode ELa side, thereby controlling an operation state of a power generating operation of generating a predetermined electrical energy based on the series of electrochemical reactions represented by the chemical reaction expressions (4) and (5).

Here, in regard to the vaporization process in the power generation fuel vaporizer 110, the steam reform reaction process in the fuel reformer 120, and the CO removal process in the CO remover 130, at the time of activating the power supply system, a predetermined temperature state is realized based on the thermal energy discharged by supplying a power to each of the electric heaters/thermometers HS1, HS2, and HS3. Furthermore, in a steady state of the power supply system, the off-gas containing hydrogen gas that is unreacted and remains in the electrochemical reaction in the power generation cell section 150 is supplied to the off-gas catalyst combustor 140 without using the electric heaters/thermometers HS1, HS2, and HS3, and a predetermined amount of oxygen $O_2$ is supplied to the off-gas catalyst combustor 140 at a predetermined timing via the air pump PN2, the fluid valve VL3, and the flowmeter FL3. As a result, a predetermined temperature state is realized based on the thermal energy generated by the catalytic combustion reaction in the off-gas catalyst combustor 140.

Each operation control in the chemical reacting section 100 and the power generation cell section 150 mentioned above is realized by the following manner. That is, in the system control section 170, for example, the CPU executes various kinds of control programs stored in the ROM or the like to subject each flow rate data (supply amount data) FO of the respective flowmeters FL1 to FL4, each temperature data measured by the electric heaters/thermometers HS1 to HS3 (data signals taken in through the respective control drivers DR3 to DR5 in a narrow sense), a current value (an output current value) corresponding to the electrical energy output from the power generation cell section 150 and others to analog-to-digital conversion, and the converted data is fetched. Valve drive signals VD required to drive the fluid valves VL1 to VL4, driver control signals CD that control the drivers DR1 to DR5 driving the pumps PN1, PN2 and the electric heaters/thermometers HS1 to HS3, and others which are subjected to digital-to-analog conversion based on each data (measured values) are output.

Moreover, a current value of the electrical energy generated by the electrochemical reaction in the power generation cell section 150 and then output is controlled based on a control signal (a current control value) consisting of a digital signal output from the system control section 170 to the output control section 160, and converted into a predetermined voltage value by the DC/DC converter 180. The electrical energy having the set current value and voltage value is temporarily stored in the secondary cell 190. Thereafter or without this storage operation, it is supplied as a load driving power to a non-illustrated load (an electronic device or the like), and also supplied as a control driving power to the system control section 170 and the respective control drivers DR1 to DR5.

Additionally, in the system control section 170 in the power supply system according to this embodiment, in particular, in order to set and maintain a fixed temperature state of each structure (the power generation fuel vaporizer 110, the fuel reformer 120, or the CO remover 130) in the chemical reacting section 100 in the steady state of the power supply system, the amount of off-gas supplied to the off-gas catalyst combustor 140 is not controlled by using a valve or the like. However, the output control section 160 controls a current value corresponding to the electrical energy generated by the power generating operation in the power generating cell section 150 based on the control signal (the current control value) output from the system control section, thereby adjusting an amount of hydrogen in the off-gas.

That is because an amount of hydrogen (a hydrogen utilization factor) consumed (utilized for the electrochemical reaction) in the fuel cell constituting the power generation cell section 150 is generally uniquely determined based on a current value of an output current corresponding to the electrical energy generated by the electrochemical reaction and then output. Therefore, controlling the current value of the output current corresponding to the electrical energy output from the power generation cell section 150 can determined the hydrogen utilization factor in the power generation cell section 150. Based on this utilization factor, an amount of hydrogen in the off-gas supplied to the off-gas catalyst combustor 140 is adjusted. Therefore, the thermal energy (a calorific value) generated by the catalytic combustion reaction can be arbitrarily controlled, thereby setting and keeping the temperature state of each structure in the chemical reacting section 100 constant.

As a result, since the amount of hydrogen in the off-gas supplied from the power generation cell section 150 is adjusted to become an amount required in the off-gas catalyst combustor 140 (i.e., a generation amount of the thermal energy required for each chemical reaction to produce hydrogen in the chemical reacting section 100), hydrogen in the off-gas is all consumed by the catalytic combustion reaction in the off-gas catalyst combustor 140.

[Control Method in Power Supply System]

A control method in the power supply system having the above-described structure will now be specifically explained.

Figure 4:
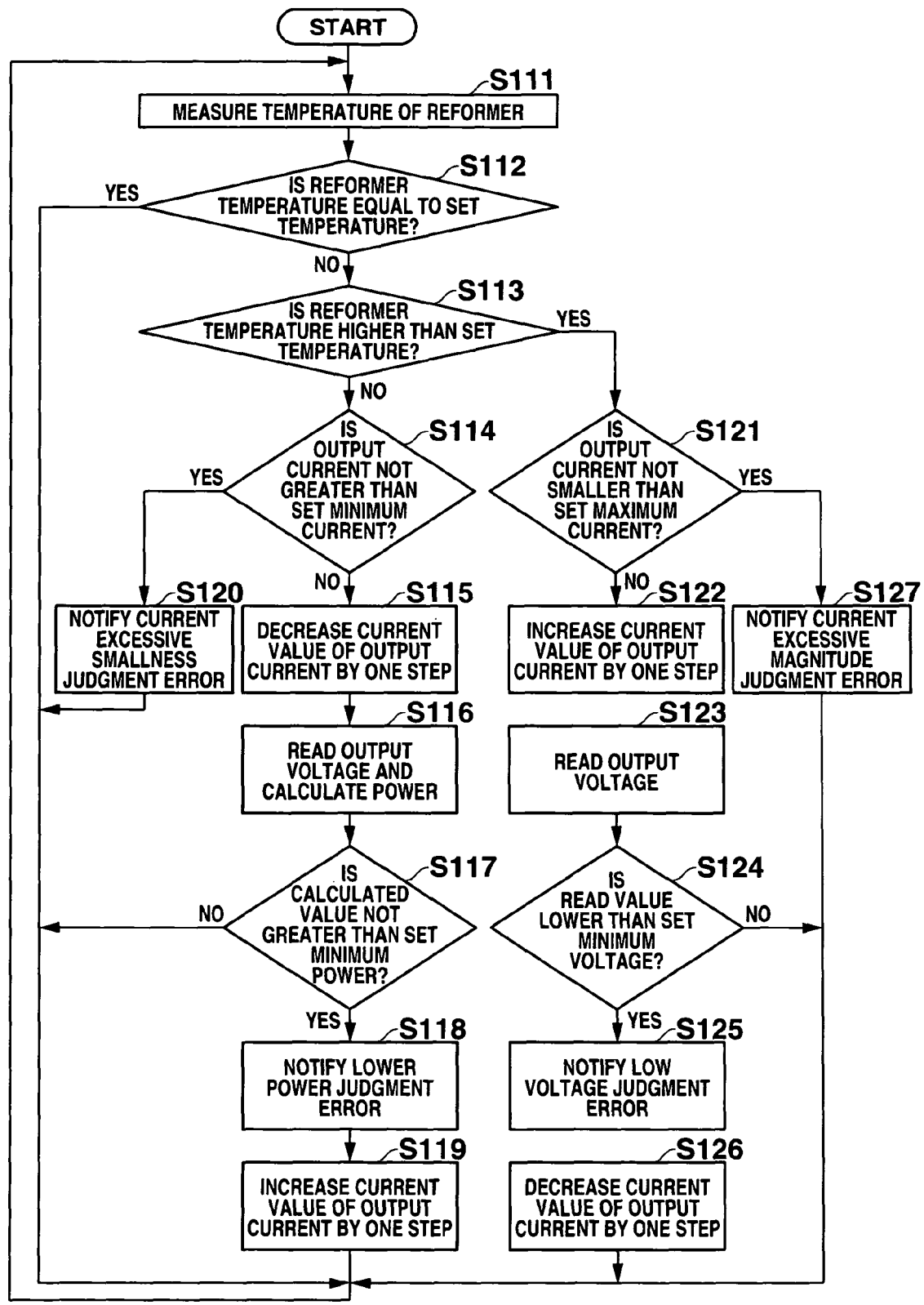
FIG. 4 is a flowchart showing an example of a control method in the power supply system according to this embodiment.

FIG. 4 is a flowchart showing an example of the control method in the power supply system according to this embodiment.

In the power supply system according to this embodiment, the system control section (a temperature comparing section, a current value setting section, a current value judging section, and a voltage value judging section) 170 uses the electric heaters/thermometers HS1 to HS3 to monitor (supervise) a temperature state in each structure (the power generation fuel vaporizer 110, the fuel reformer 120, or the CO remover 130) in the chemical reacting section 100, sets the monitored state to a fixed temperature state suitable for each chemical reaction to generate hydrogen, and executes temperature control so that this temperature state is maintained.

Further, when the temperature state in each structure in this chemical reacting section 100 changes due to any factor (e.g., a change in external temperature, a change in output characteristics in the power generation cell section 150, or deterioration in characteristics of the catalytic combustion reaction in the of-gas catalyst combustor 140), the following series of control operations are executed to increase/decrease a current value of an output current corresponding to the electrical energy output from the power generation cell section 150 and thereby control an amount of hydrogen in the off-gas, thus setting and keeping the temperature state constant.

It is to be noted that an example of executing temperature control over the fuel reformer 120 constituting the chemical reacting section 100 will be explained in detail hereinafter. It is needless to say that the equivalent control method can be applied to an example including other structures (the power generation fuel vaporizer 110, and the CO remover 130) as will be described later.

In temperature control over the chemical reacting section 100 (the fuel reformer 120) in the power supply system according to this embodiment, a temperature state of the fuel reformer 120 is first measured (detected) constantly, periodically or at an arbitrary timing by the electric heater/temperature indicator HS2, and the measured temperature state is taken in to the system control section 170 (S111; a temperature measuring step). Specifically, the system control section 170 supplies a driver control signal CD to the control driver DR4 to flow a small amount of a current to the electric heater/temperature indicator HS2, and a voltage value at this moment is fetched as temperature measurement data via the control driver DR4. Furthermore, calculating a resistance value at this moment based on the temperature measurement data (a voltage value) acquires a temperature of the fuel reformer 120.

Then, whether a temperature of the fuel reformer 120 (a reformer temperature) matches with (is the same as) preset temperature conditions (a set temperature) (S112; a temperature comparing step) is judged. When the reformer temperature matches with the set temperature, the control returns to the step S111 to continue a temperature measuring operation in the fuel reformer 120. On the other hand, when the reformer temperature is different from the set temperature, whether the reformer temperature is higher than the set temperature is judged (S113).

When the reformer temperature is lower than the set temperature, an output current Iout from the power generation cell section 150 is reduced to increase the temperature, and a hydrogen utilization factor in the power generation cell section 150 is reduced to increase an amount of hydrogen in the off-gas. When the reformer temperature is higher than the set temperature, the output current Iout from the power generation cell section 150 is increased to lower the temperature, and the hydrogen utilization factor in the power generation cell section 150 is increased to reduce the amount of hydrogen in the off-gas. Here, a current value of the output current Iout output from the power generation cell section 150 is restricted to a range from a later-described minimum current value to a maximum current value. Thus, when it is determined that the reformer temperature is lower than the set temperature at the step S113, whether the current value of the output current Iout from the power generation cell section 150 is not greater than the preset minimum current value (a set minimum current) is judged at S114 (a current value judging step). On the other hand, when the reformer temperature is higher than the set temperature, whether the current value of the output current Iout is not smaller than the preset maximum current value at S121 (a current value judging step).

When the value of the output current Iout from the power generation cell section 150 is not greater than the minimum current value (the set minimum current) at the step S114, since the current value of the output current Iout cannot be reduced beyond this value, it is determined that the current value is excessively small, and a notifying section (a display, a speaker or the like) additionally provided in the power supply system or an electronic device having the power supply system mounted thereon gives error information (S120). Here, after giving the error information, the control returns to the step S111 to continue the temperature measuring operation in the fuel reformer 120, or the power supply system is shut down (a stop operation) in accordance with a degree of extreme smallness of the current value of the output current Iout.

On the other hand, when the current value of the output current Iout is larger than the minimum current value (the set minimum current), a level of the current value of the output current is one step reduced (S115; a current value setting step). Specifically, a current control value of a control signal output to such an output control section 160 as shown in FIG. 3 from the system control section 170 is changed from a specified value to a value that is one step lower than the specified value, thereby reducing the current value of the output current Iout from the power generation cell section 150 by one step.

When the reformer temperature is lower than the set temperature in this manner, the current value of the output current Iout from the power generation cell section 150 is reduced to lower a consumption amount of hydrogen (lower the hydrogen utilization factor) in the power generation cell section 150. As a result, an amount of hydrogen contained in the off-gas discharged from the power generation cell section 150 can be increased, and hence the thermal energy supplied from the off-gas catalyst combustor 140 to the fuel reformer 120 can be increased to raise the reformer temperature.

Then, a power output from the power generation cell section 150 is restricted to a range that is not smaller than a later-described minimum power value (a set minimum power). An output voltage from the power generation cell section 150 whose current value is one step lowered is read as voltage data via the DC/DC converter 180 to calculate a generation power (S116), and whether the generation power (a calculated value) is not greater than the minimum power value (S117; a voltage value judging step) is judged.

When the generation power (the calculated value) is greater than the minimum power value (the set minimum power) at the step S117, the control returns to the step Sill to continue the temperature measuring operation in the fuel reformer 120. On the other hand, when the generation power (the calculated value) is not greater than the minimum power value (the set minimum power), it is determined that the output power is excessively small (a lower power judgment), the notifying section supplies error information (S118), and a level of the current value of the output current Iout is one step increased (S119). Specifically, a current control value of a control signal output from the system control section 170 to the output control section 160 is changed to a value that is one step higher than the value set at the step S115, whereby the current value of the output current Iout from the power generation cell section 150 is increased by one step (the current value is restored). Then, the control returns to the step S111 to continue the temperature measuring operation in the fuel reformer 120.

Moreover, when the current value of the output current Iout is not smaller than the maximum current value (a set maximum current) at the step S121, since the current value of the output current Iout cannot be increased any further, it is determined that the current value is extremely large, and the notifying section (a display, a speaker, or the like) gives error information (S127). Here, after giving the error information, the control returns to the step Sill to continue the temperature measuring operation in the fuel reformer 120, or the power supply system is shut down (the stop operation) in accordance with a degree of extreme largeness of a value of the output current.

On the other hand, when the current value of the output current Iout is smaller than the maximum current value (the set maximum current), the current control value of the control signal output from the system control section 170 to the output control section 160 is changed from a specified value to a value that is one step higher than the specified value, thereby increasing the current value of the output current Iout by one step (S122; a current value setting step).

When the reformer temperature is higher than the set value in this manner, the current value of the output current Iout from the power generation cell section 150 is raised to increase a consumption amount of hydrogen (increase the hydrogen utilization factor) in the power generation cell section 150. As a result, since an amount of hydrogen contained in the off-gas discharged from the power generation cell section 150 can be reduced, the thermal energy supplied from the off-gas catalyst combustor 140 to the fuel reformer 120 can be reduced to lower the reformer temperature.

Then, a value of an output voltage from the power generation cell section 150 is restricted to a range that is not smaller than a later-described minimum voltage value (a set minimum voltage). The output voltage from the power generation cell section 150 whose current value is one step increased is read as voltage data via the DC/DC converter 180 (S123), and whether the voltage value (a read value) is lower than the minimum voltage value (the set minimum voltage) is judged (S124; a voltage value judging step).

When the voltage value (the read value) is not smaller than the minimum voltage value (the set minimum voltage) at the step S124, the control returns to the step Sill to continue the temperature measuring operation in the fuel reformer 120. On the other hand, when the voltage value (the read value) is lower than the minimum voltage value (the set minimum voltage), it is determined that the voltage value is extremely small (a low voltage judgment), the notifying section gives error information (S125), and a current control value of a control signal output from the system control section 170 to the output control section 160 is changed to a value that is one step lower than the value set at the step S122. As a result, the current value (the output current Iout) corresponding to the electrical energy is lowered by one step (S126). Then, the control returns to the step Sill to continue the temperature measuring operation in the fuel reformer 120.

Incidentally, when the error information is given and then the control returns to the step S111 to continue the temperature measuring operation at the steps S120 and S127, since the reformer temperature is not rapidly changed to an appropriate state as it is, the fluid valve VL3 that adjusts an amount of oxygen supplied to the off-gas catalyst combustor 140 or the fluid valve VL1 that indirectly adjusts an amount of a fuel gas supplied to the fuel reformer 120 may be controlled, for example. As a result, the temperature state of the fuel reformer 120 is changed to an appropriate state and then the temperature measuring operation at the step S111 is controlled to be continued.

A relationship between power generation characteristics in the power generation cell section applied to the power supply system according to this embodiment and the control method will now be concretely explained.

Figure 5:
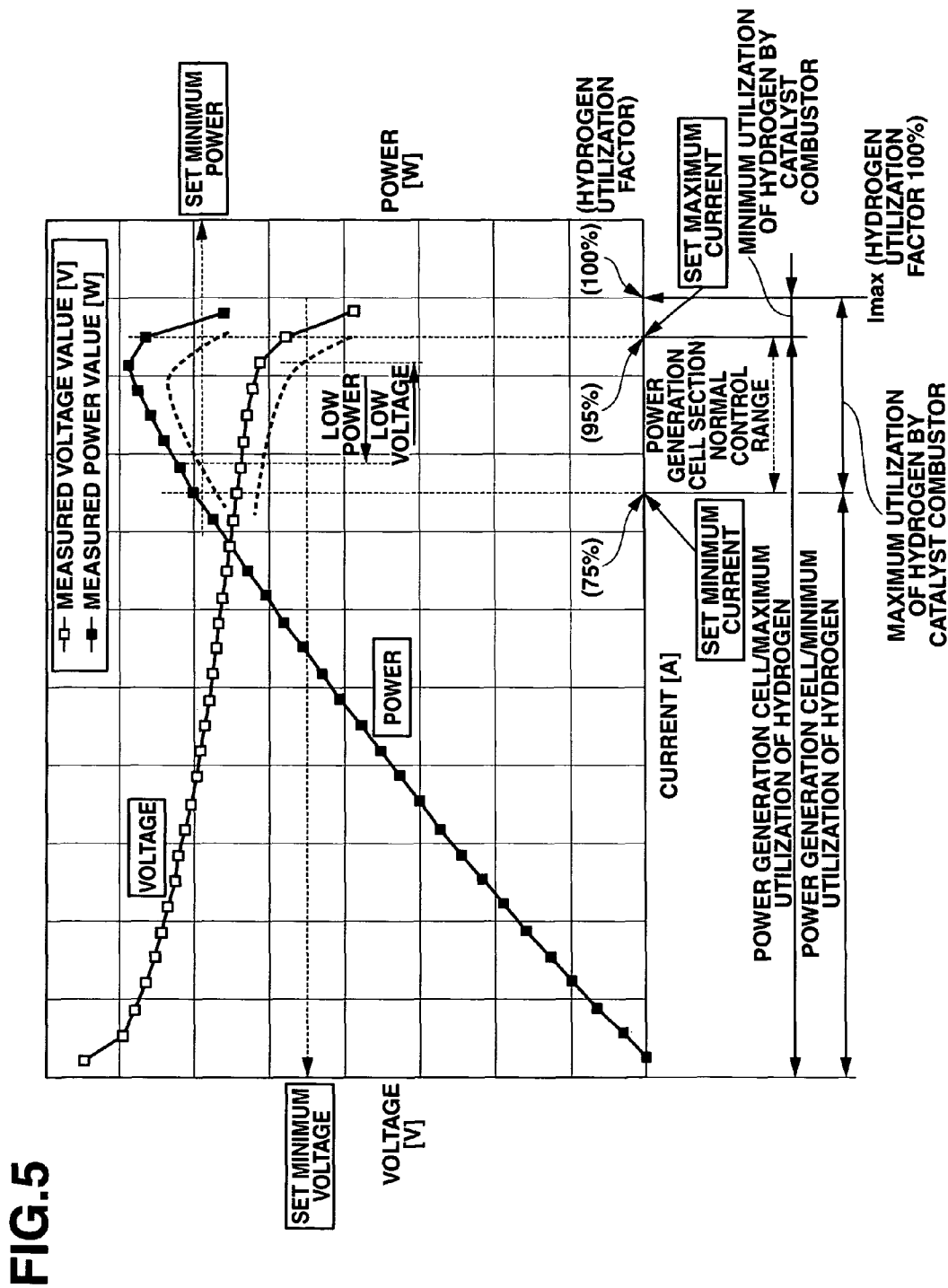
FIG. 5 is a view showing output characteristics (power generation characteristics) of the power generation cell section applied to the power supply system according to this embodiment.
Figure 6:
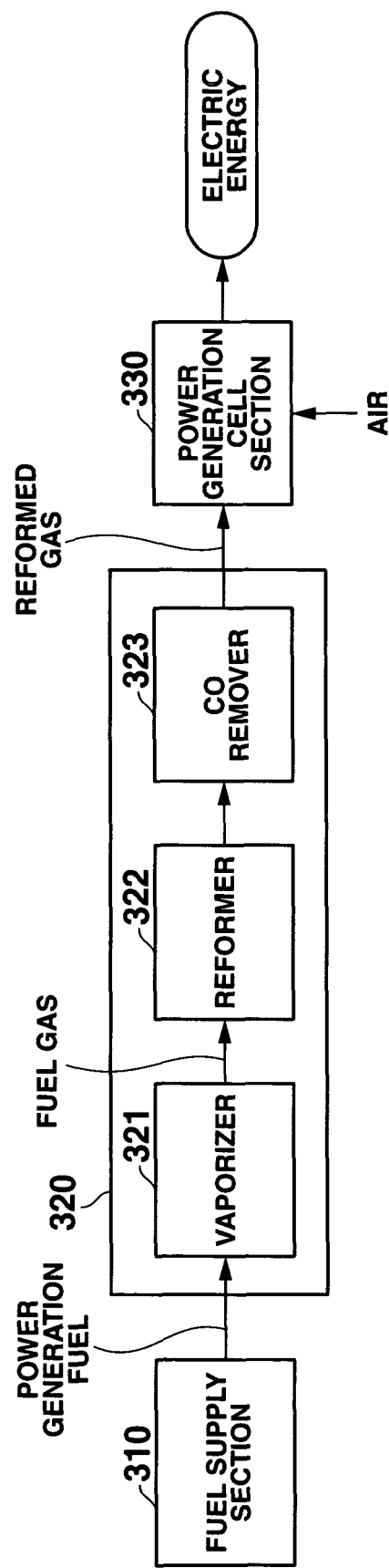
FIG. 6 is a schematic block diagram showing a structural example of a power supply system to which a fuel cell adopting a reformed fuel supply mode is applied in a conventional technology.

FIG. 5 is a view showing output characteristics (power generation characteristics) of the power generation cell section applied to the power supply system according to this embodiment.

In the control method in the power supply system (temperature control over the chemical reacting section), a control range of the electrical energy output from the power generation cell section 150 has a limit, and control is usually executed in a power generating operation range where the hydrogen utilization factor becomes 75% to 95%.

Further, in the power supply system according to this embodiment, as mentioned above, the electrical energy output from the power generation cell section 150 is supplied to the DC/DC converter 180, converted into a predetermined fixed voltage, and then fed to a load as a load driving power.

In such a power supply system, as shown in FIG. 5, when a current value (an output current) corresponding to the electrical energy output from the power generation cell section 150 is increased, a voltage value (an output voltage) of the power generation cell section 150 tends to be gradually lowered (see a characteristic curve of a measured voltage value).

Furthermore, a power value (a generation power) calculated based on the voltage value tends to substantially linearly increase when the current value (the output current) is increased, and has a maximum value in a control rage where the hydrogen utilization factor of the power generation cell section 150 becomes 75% to 95% (a usual control range of the power generation cell section 150) (see a characteristic curve of a measured power value).

Here, the set minimum current, the set maximum current, the set minimum power, and the set minimum voltage shown in the FIG. 4 flowchart and FIG. 5 output characteristic view are set values corresponding to a limit of a range where the power generation cell section 150 stably operates in order to prevent an output from the power generation cell from precipitously dropping or the power generation cell from being damaged or deteriorated.

As described above, the control method in the power supply system (the series of temperature control operations) is excellently realized within the control range where the hydrogen utilization factor of the power generation cell 150 becomes 75% to 95% (the usual control range) and the range where the power generation cell stably operates.

Here, when the power supply system normally operates, it is designed to excellently operate in the above-described ranges. However, when a phenomenon that an output voltage from the power generation cell section 150 or a power value (a generation power) calculated based on this output voltage drops to be lower than the set minimum voltage or the set minimum power, this means that any failure (a malfunction) occurs in the power supply system. In such a case, the DC/DC converter 180 deviates from the range that allows a normal operation, and a normal operation of a load (an electronic device or the like) driven by the power supply system cannot be maintained. When such a state occurs, error information is given (e.g., displayed), a temperature state of the fuel reformer 120 is changed to a normal state, and then the temperature measuring operation in the fuel reformer 120 is continued, or the power supply system is shut down (a stop operation).

As described above, in the control method in the power supply system according to this embodiment, when a temperature of the fuel reformer 120 is higher than the set temperature, a current value of an output current from the power generation cell section 150 is increased to raise a consumption amount of hydrogen in the power generation cell section 150, thereby increasing a hydrogen utilization factor. That is, the reforming reaction in the fuel reformer 120 is promoted with an increase in temperature, and hydrogen is generated beyond an amount of hydrogen consumed in the power generation cell section 150 and the off-gas catalyst combustor 140, and an amount of hydrogen in the off-gas is increased. When such a phenomenon occurs, increasing the hydrogen utilization factor in the power generation cell section 150 relatively reduces the amount of hydrogen in the off-gas to decrease a thermal energy produced by the off-gas catalyst combustor 140, thereby lowering the temperature of the fuel reformer 120.

On the other hand, when a temperature of the fuel reformer 120 is lower than the set temperature, a current value of an output current from the power generation cell section 150 is reduced to decrease a consumption amount of hydrogen in the power generation cell section 150, thereby lowering a hydrogen utilization factor. That is, the reforming reaction in the fuel reformer 120 is suppressed with a reduction in temperature, and hydrogen less than an amount of hydrogen consumed in the power generation cell section 150 and the off-gas catalyst combustor 140 is generated, and an amount of hydrogen in the off-gas is reduced. When such a phenomenon occurs, reducing the hydrogen utilization factor in the power generation cell section 150 relatively increases the amount of hydrogen in the off-gas to heighten a thermal energy generated by the off-gas catalyst combustor 140, thereby increasing the temperature of the fuel reformer 120.

As described above, when the hydrogen utilization factor in the power generation cell section 150 is appropriately adjusted in accordance with a temperature of the chemical reacting section 100 (the fuel reformer 120), an amount of hydrogen contained on the off-gas supplied from the power generation cell section 150 to the off-gas catalyst combustor 140 can be relatively increased/reduced to be an amount required for generation of a thermal energy in the off-gas catalyst combustor 140 so that hydrogen in the off-gas can be all consumed. As a result, a power generation efficiency of the power supply system can be improved. In the control method in the power supply system according to the present invention in particular, since temperature control over the chemical reacting section 100 can be executed in the range where the power generation cell section 150 that generates electrical energy and the DC/DC converter 180 that supplies a load driving power to a load can excellently operate, the driving state of the entire power supply system can be optimized to further improve the power generation efficiency.

Moreover, in the power supply system according to this embodiment, the power generating operation in the power generation cell section 150 (i.e., the hydrogen utilization factor) and an amount of hydrogen in the off-gas supplied to the off-gas catalyst combustor 140 are controlled based on an amount of hydrogen directly fed from the chemical reacting section 100 (the fuel reformer 120). Therefore, such a valve, a flowmeter or the like that controls a supply amount of the off-gas to the off-gas catalyst combustor 140 as explained in conjunction with the conventional technology does not have to be provided. Additionally, a gas discharged from the off-gas catalyst combustor 140 (an discharge gas) rarely contains hydrogen. Therefore, such a residual gas burner as explained in conjunction with the conventional technology does not have to be provided. Accordingly, it is possible to reduce a size or simplify a structure of the power supply system, or decrease a product cost.

It is to be noted that, in the control method in the power supply system, the description has been given as to the example where the electric heater/temperature indicator HS2 monitors a temperature state in the fuel reformer 120 constituting the chemical reacting section 100 and an amount of hydrogen in the off-gas supplied to the off-gas catalyst combustor 140 is adjusted in accordance with the temperature. However, the present invention is not restricted thereto. For example, when temperature states of the respective structures (the power generation fuel vaporizer 110, the fuel reformer 120, and the CO remover 130) in the chemical reacting section 100 of the power supply system that is in a steady state are set and maintained based on a thermal energy supplied from the off-gas catalyst combustor 140, the electric heaters/thermometers HS1, HS2, and HS3 may monitor the temperature states of at least one of the power generation fuel vaporizer 110, the fuel reformer 120, and the CO remover 130 constituting the chemical reacting section 100, thereby adjusting an amount of hydrogen in the off-gas supplied to the off-gas catalyst combustor 140 in accordance with the temperature.

Further, in the power supply system according to the foregoing embodiment, the description has been given as to the example where methanol is applied as a power generation fuel. However, the present invention is not restricted thereto. Other hydrocarbon-based (alcohols) liquid fuels may be applied as the power generation fuel as long as they contain hydrogen atoms in their compositions.

Furthermore, in the power supply system, the description has been given as to the example where the proton-exchange membrane fuel cell is applied as the power generation cell section that generates a power by using hydrogen gas produced by the chemical reacting section. However, the present invention is not restricted thereto, and fuel cells having other structures may be used. Moreover, the present invention can be excellently applied to various kinds of conformations such as a structure based on a mechanical energy converting function or the like that uses a pressure energy involved by a combustion reaction or the like of hydrogen gas generated by the chemical reacting section to rotate a power generator in order to produce electrical energy (an internal-combustion or an external-combustion power generation of, e.g., a gas-fired combustion turbine, a rotary engine, or a Stirling engine) or a structure that utilizes a thermal energy involved by a combustion reaction (temperature difference power generation).

What is claimed is:

1. A power supply system comprising:
   a chemical reacting section that receives a power generation fuel and reforms the power generation fuel by a chemical reaction to generate a power generation gas containing hydrogen;
   a temperature measuring section that measures a temperature of the chemical reacting section;
   a power generating section that receives the power generation gas, reacts a part of the power generation gas to generate electrical energy, supplies the generated electrical energy to a load, and discharges an unreacted component in the power generation gas as an off-gas;
   a heating section that receives the off-gas, uses the off-gas to generate a thermal energy, and heats the chemical reacting section;
   an output control section that controls an amount of electrical energy output from the power generating section; and
   a control section that is programmed to increase/decrease the amount of electrical energy output from the power generating section by the output control section to maintain the temperature of the chemical reacting section which is set based on the thermal energy generated by the heating section at a predetermined temperature;
   wherein:
      the control section is programmed to control the amount of electrical energy output from the power generating section based on the temperature of the chemical reacting section measured by the temperature measuring section,
      the output control section controls a current value of an output current that corresponds to the amount of electrical energy output from the power generating section, in accordance with the control of the amount of electrical energy,
      the control section includes a current value judging section that is programmed to detect the current value of the output current and to judge whether the detected current value of the output current falls within a range where the power generating section demonstrates specific power generation characteristics,
      the control section is programmed to compare the detected current value of the output current with a preset minimum current value when the temperature of the chemical reacting section measured by the temperature measuring section is lower than the predetermined temperature; and
      the control section is programmed to compare the detected current value of the output current with a preset maximum current value when the temperature of the chemical reacting section measured by the temperature measuring section is higher than the predetermined temperature.

2. The power supply system according to claim 1, wherein:
   the chemical reacting section comprises a reformer that generates the power generation gas based on a reforming reaction,
   the predetermined temperature is a temperature suitable for the reforming reaction in the reformer, and
   the control section includes temperature comparing means for comparing the temperature of the chemical reacting section measured by the temperature measuring section with the predetermined temperature, and the control section is programmed to increase/decrease the amount of electrical energy output from the power generating section based on a comparison result obtained by the temperature comparing means.

3. The power supply system according to claim 1, wherein the temperature measuring section also functions as an electric heater that generates the thermal energy to heat the chemical reacting section.

4. The power supply system according to claim 1, wherein the heating section generates the thermal energy based on a combustion reaction using the hydrogen contained in the off-gas.

5. The power supply system according to claim 4, wherein:
   an amount of hydrogen in the off-gas varies in accordance with the amount of electrical energy output from the power generating section controlled by the output control section, and
   an amount of thermal energy generated by the heating section is set in accordance with the amount of hydrogen contained in the off-gas.

6. The power supply system according to claim 1, further comprising a voltage converting section that converts the electrical energy output from the power generating section to produce a load driving power having a predetermined voltage value and current value and supplies the load driving power to the load.

7. The power supply system according to claim 6, further comprising a power holding section that stores the electrical energy output from the power generating section,
wherein the voltage converting section converts the electrical energy stored in the power holding section to produce the load driving power.

8. The power supply system according to claim 1, wherein the control section includes a voltage value judging section that is programmed to detect a voltage value of an output voltage from the power generating section when the electrical energy is output from the power generating section and to judge whether the voltage value of the output voltage falls within a range where the power generating section demonstrates said specific power generation characteristics.

9. The power supply system according to claim 1, wherein the chemical reacting section comprises:
a vaporizer that receives the power generation fuel and water and vaporizes the supplied power generation fuel and water; and
a reformer that receives the vaporized power generation fuel and water generated by the vaporizer and generates a gas containing hydrogen as the power generation gas based on a catalytic reaction.

10. The power supply system according to claim 9, wherein the power generation fuel is a liquid fuel containing a hydrogen atom in a composition thereof.

11. The power supply system according to claim 9, wherein the heating section supplies the thermal energy to the fuel reformer.

12. The power supply system according to claim 1, wherein the power generating section generates the electrical energy based on an electrochemical reaction using the hydrogen contained in the power generation gas.

13. The power supply system according to claim 12, wherein the power generating section is a proton-exchange membrane fuel cell.

14. A control apparatus of a power supply system, the power supply system comprising: a chemical reacting section that receives a power generation fuel and reforms the power generation fuel by a chemical reaction to generate a power generation gas containing hydrogen; a power generating section that receives the power generation gas and reacts a part of the power generation gas to generate electrical energy; a heating section that receives an off-gas discharged from the power generating section and generates a thermal energy by using the off-gas to heat the chemical reacting section; and a temperature measuring section that measures a temperature of the chemical reacting section, the control apparatus comprising:

an output control section that controls an amount of electrical energy output from the power generating section; and
a control section that is programmed to increase/decrease the amount of electrical energy output from the power generating section by the output control section to maintain the temperature of the chemical reacting section which is set based on the thermal energy generated by the heating section at a predetermined temperature;
wherein:
the control section is programmed to control the amount of electrical energy output from the power generating section based on the temperature of the chemical reacting section measured by the temperature measuring section,
the output control section controls a current value of an output current that corresponds to the amount of electrical energy output from the power generating section, in accordance with the control of the amount of electrical energy,
the control section includes a current value judging section that is programmed to detect the current value of the output current and to judge whether the detected current value of the output current falls within a range where the power generating section demonstrates specific power generation characteristics,
the control section is programmed to compare the detected current value of the output current with a preset minimum current value when the temperature of the chemical reacting section measured by the temperature measuring section is lower than the predetermined temperature; and
the control section is programmed to compare the detected current value of the output current with a preset maximum current value when the temperature of the chemical reacting section measured by the temperature measuring section is higher than the predetermined temperature.

15. The control apparatus according to claim 14, wherein:
the predetermined temperature is a temperature suitable for the chemical reaction in the chemical reacting section, and
the control section is programmed to increase/decrease the amount of electrical energy output from the power generating section based on a magnitude of a difference between the temperature of the chemical reacting section measured by the temperature measuring section and the predetermined temperature.

16. The control apparatus according to claim 14, wherein the control section includes a voltage value judging section that is programmed to detect a voltage value of an output voltage from the power generating section when the electrical energy is output from the power generating section and to judge whether the voltage value of the output voltage falls within a range where the power generating section demonstrates said specific power generation characteristics.

* * * * *